(12) United States Patent
Chambers

(10) Patent No.: US 10,845,122 B2
(45) Date of Patent: Nov. 24, 2020

(54) CLIP FOR SUPPORTING REFRACTORY STRUCTURE

(71) Applicant: MERKLE INTERNATIONAL, INC., Galena, IL (US)

(72) Inventor: Michael J. Chambers, Dubuque, IA (US)

(73) Assignee: MERKLE INTERNATIONAL, INC., Galena, IL (US)

( * ) Notice: Subject to any disclaimer, the term of this patent is extended or adjusted under 35 U.S.C. 154(b) by 0 days.

(21) Appl. No.: 16/222,230

(22) Filed: Dec. 17, 2018

(65) Prior Publication Data

US 2020/0191485 A1 Jun. 18, 2020

(51) Int. Cl.
| | |
|---|---|
| *F27D 1/14* | (2006.01) |
| *E04B 1/24* | (2006.01) |
| *F27D 1/00* | (2006.01) |
| *F16B 2/02* | (2006.01) |
| *F16B 12/14* | (2006.01) |
| *F16B 2/06* | (2006.01) |
| *E04B 1/41* | (2006.01) |
| *F16B 35/00* | (2006.01) |

(52) U.S. Cl.
CPC ............ *F27D 1/141* (2013.01); *E04B 1/2403* (2013.01); *F27D 1/004* (2013.01); *E04B 1/40* (2013.01); *E04B 2001/2418* (2013.01); *E04B 2001/2424* (2013.01); *E04B 2001/2439* (2013.01); *E04B 2001/2457* (2013.01); *F16B 2/02* (2013.01); *F16B 2/065* (2013.01); *F16B 35/00* (2013.01); *F27D 2001/0059* (2013.01)

(58) Field of Classification Search
CPC .. F16B 7/0493; F16B 2/14; F16B 2/02; F16B 2/065; E04B 1/40; E04B 1/34352; E04B 1/2403; E04B 2001/4005; E04B 2001/2418; E04B 2001/2424; E04B 2001/2439; E04B 2001/2457; F27D 1/141
See application file for complete search history.

(56) References Cited

U.S. PATENT DOCUMENTS

| | | | | |
|---|---|---|---|---|
| 2,208,358 | A | * 7/1940 | Chandler | ................ E04H 12/32 248/540 |
| 3,958,519 | A |   5/1976 | Merkle, Jr. | |
| 4,379,651 | A | * 4/1983 | Nagashima | ............... E04G 7/26 248/228.5 |

(Continued)

*Primary Examiner* — Tan Le
(74) *Attorney, Agent, or Firm* — Pauley Erickson & Swanson

(57) ABSTRACT

A clip for supporting a refractory structure and/or a hanger structure. The clip can have a body with two legs connected to a top. A fastener that extends through the top can be adjusted and/or secured to fix a relative position of the clip with respect to the refractory structure and/or the hanger structure. An adjuster that extends through the top, such as a tab connected to or integrated with the top, can be used to adjust a distance, such as a vertical height, of the clip with respect to adjacent fixed structural members. The adjuster can be used to compensate for a distance change resulting from the refractory structure, the hanger structure, one or more adjacent fixed structural members, and/or any other similar structure, bending, flexing and/or otherwise deforming due to exposure of the components to a relatively high temperature.

20 Claims, 5 Drawing Sheets

(56) References Cited

U.S. PATENT DOCUMENTS

| | | | | |
|---|---|---|---|---|
| 5,146,724 | A * | 9/1992 | Angelo | F16B 2/02 |
| | | | | 248/228.1 |
| 8,167,258 | B1 * | 5/2012 | Wentworth | E04B 1/2403 |
| | | | | 248/214 |
| 8,534,625 | B2 * | 9/2013 | Heath | F16B 2/065 |
| | | | | 138/106 |
| 2013/0214098 | A1 * | 8/2013 | Greenfield | F16L 3/24 |
| | | | | 248/62 |
| 2016/0040702 | A1 * | 2/2016 | Broussard | F16B 7/0493 |
| | | | | 248/201 |

* cited by examiner

CLIP FOR SUPPORTING REFRACTORY STRUCTURE

BACKGROUND OF THE INVENTION

Field of the Invention

This invention relates to a clip or other similar holding apparatus or device that can be used to adjust, for example, the vertical height of a suspended refractory structure, such as those often used in high temperature furnaces, such as furnaces used to produce steel, glass and/or other products that require relatively high temperatures for the process.

Discussion of Related Art

Many conventional furnaces use structural members, such as I-beams, steel rails and other structural members to support refractory structures and other frame or support members, particularly in relatively high temperature furnaces that have an interior of the furnace housing support structures for heat-resistant refractory firebrick or tiles. Many support structures are relatively heavy and require substantial support, for example, by a roof structure or a side structure. Many conventional support frames include I-beams or wide flange beams with smaller I-beams or other similar structural members to support the refractory structures.

Some conventional high temperature furnace constructions have hangers that accommodate, for example, a support frame for suspending or otherwise supporting a refractory structure. U.S. Pat. No. 3,958,519 discloses hangers used in a high temperature furnace construction for supporting refractory firebrick or refractory tile, and some structural members are supported by spaced apart structural plate hanger beam clips that engage structural I-beams or other suitable hanger beams. The entire disclosure of U.S. Pat. No. 3,958,519 is incorporated by reference into this specification.

Over certain time periods, when many of the high temperature furnaces operate with extremely high temperatures, quite often structural supports, particularly I-beams or other structural members made of metal or metal composite materials, bend, warp or deform out of their original shape or designed shape. There is an apparent need for hanger components that can be used to adjust a distance, such as a vertical height, of the I-beams or other structural members, without removing the entire refractory structure, including the support members.

SUMMARY OF THE INVENTION

It is one object of this invention to provide hanger components that can be used to adjust or compensate for a distance difference or adjustment, such as a height difference or adjustment, particularly when relatively high temperatures cause the structural members supporting the refractory structure to bend, flex, warp and/or otherwise become distorted from the original shape or design of the hanger components.

In some embodiments of this invention, a clip is secured to a hanger structure and/or a refractory structure. An adjuster can be used to change or vary a distance, such as a vertical height, or a position of a body of the clip with respect to the structural members supporting the refractory structure. According to different embodiments of this invention, it is possible to compensate for a change in distance, such as a change in a vertical height, for example, that results from structural members bending, flexing and/or otherwise deforming from their original shape or design, particularly without disassembling and reassembling the structural components and/or refractory structure.

The clip apparatus and method according to this invention can be used to significantly reduce the time required to perform maintenance on refractory structures and/or hanger structures that require repair or replacement. It is possible to operate one relatively simple adjusting mechanism to accomplish the vertical height adjustment and/or the other distance adjustment needed to compensate for a distance change.

DETAILED DESCRIPTION OF THE INVENTION

Figure 5:
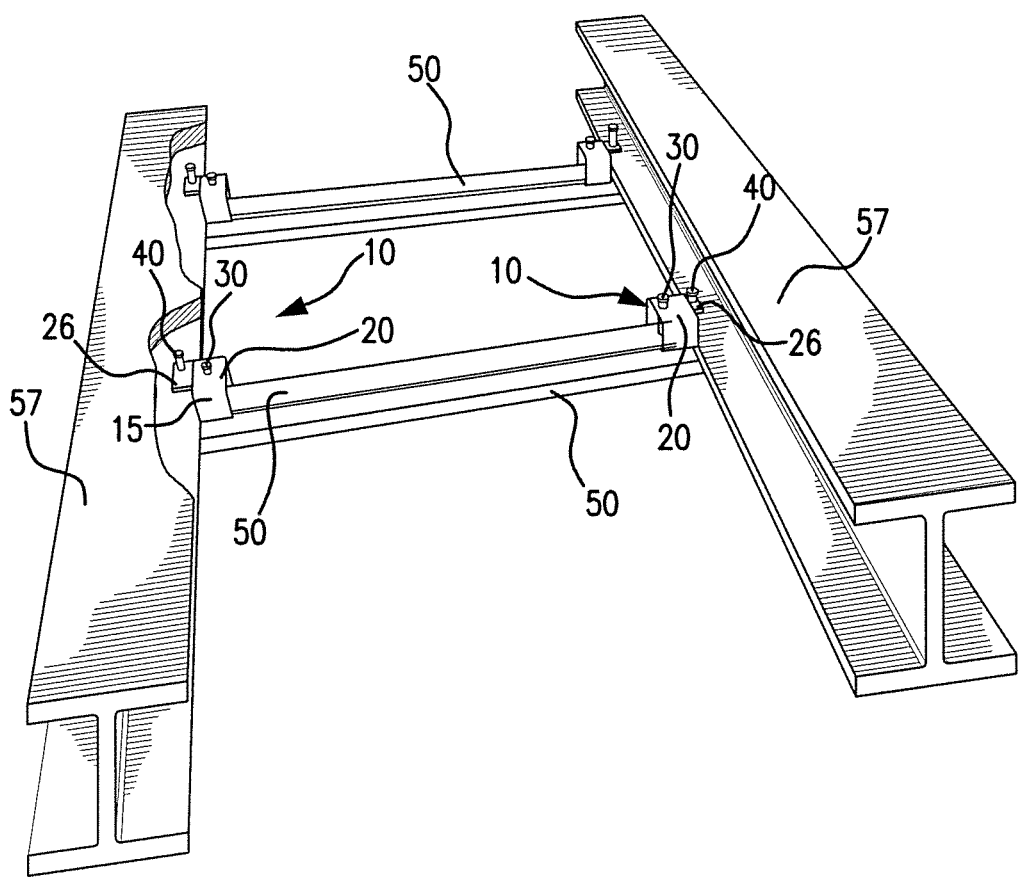
FIG. 5 shows a perspective view of a plurality of clips and hanger structures, according to one embodiment of this invention.
Figure 6:
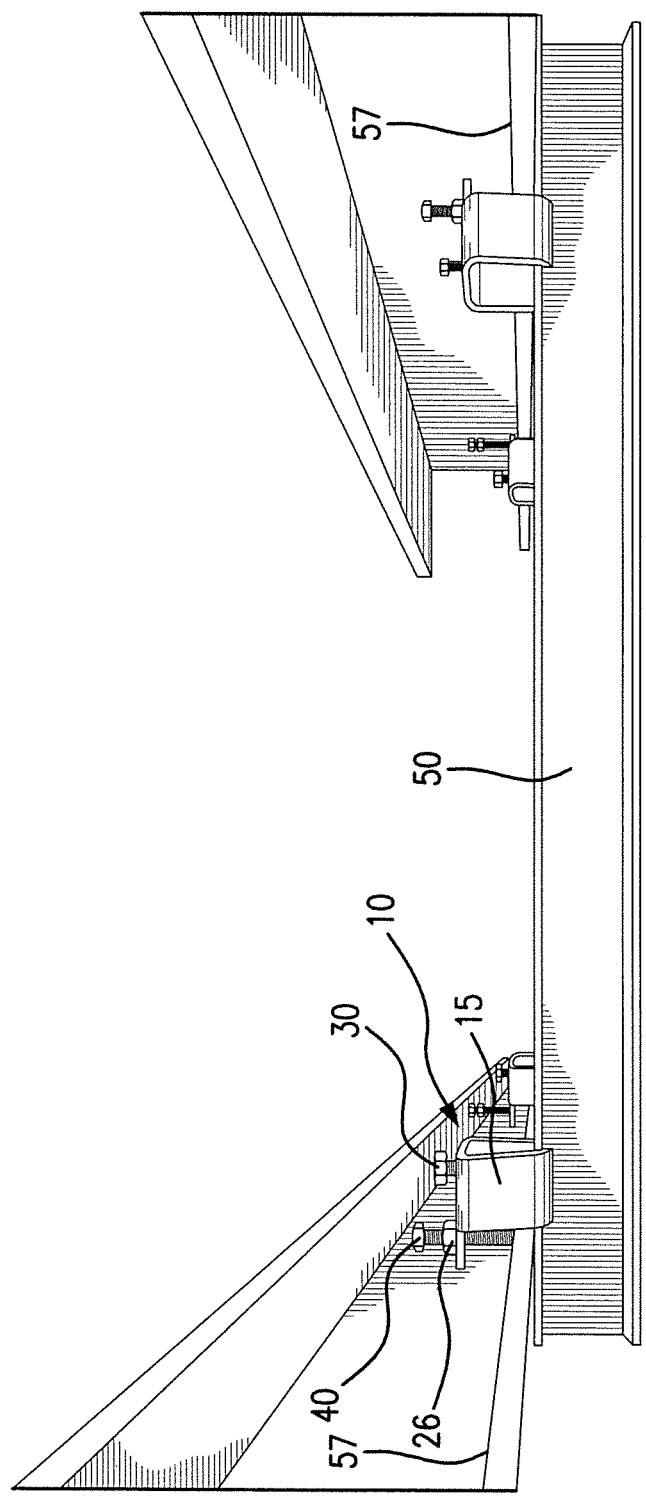
FIG. 6 shows a side view of a plurality of clips and hanger structures, according to one embodiment of this invention.

FIGS. 1-4 show clips 10 according to different embodiments of this invention. FIGS. 5 and 6 show a plurality of clips 10 combined to support one or more hanger structures 50, according to different embodiments of this invention. In some embodiments of this invention, a combination of clips 10 and one or more hanger structures 50 can be used to support or retain a suspended refractory structure 55, such as those often used in high temperature furnaces, particularly furnaces used to produce steel products, glass products and/or any other suitable products that require relatively high process operating temperatures.

Figure 1:
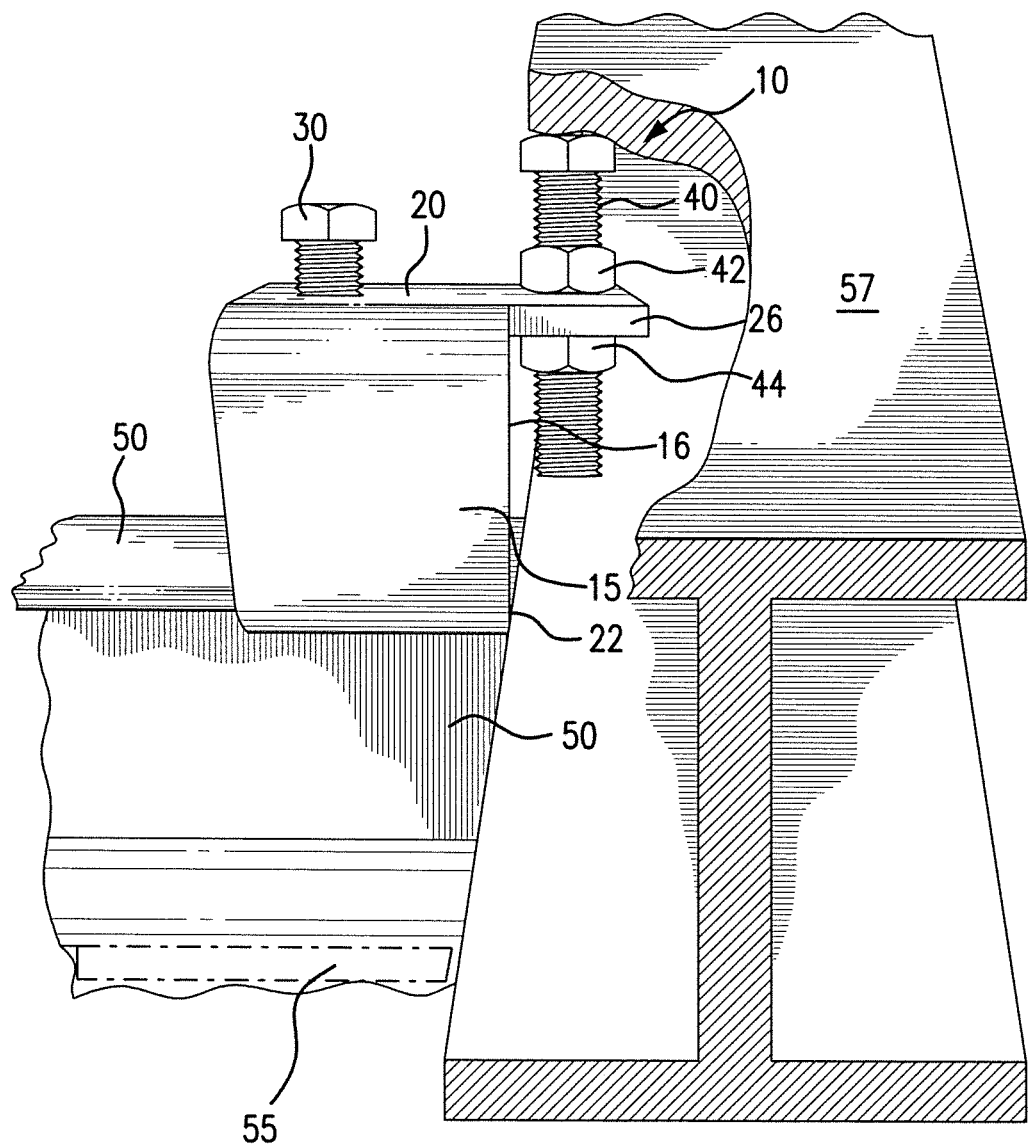
FIG. 1 shows a perspective view of a clip, a hanger structure and a support beam, according to one embodiment of this invention.
Figure 4:
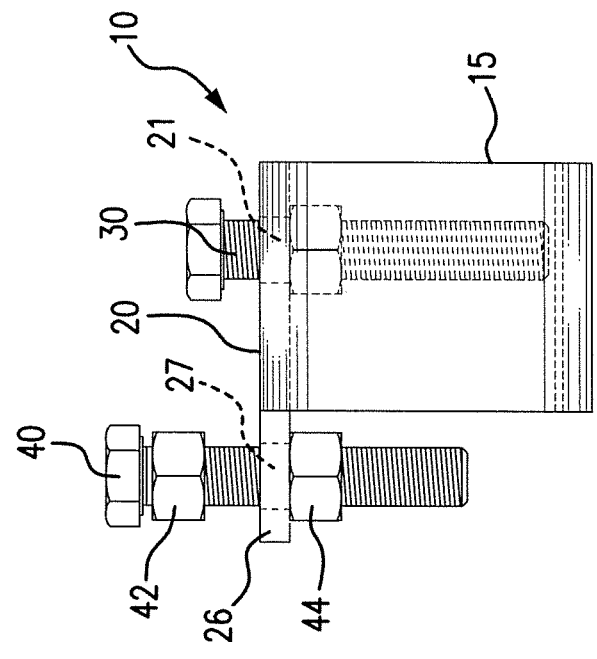
FIG. 4 shows a side view of the clip, as shown in FIG. 2.
Figure 3:
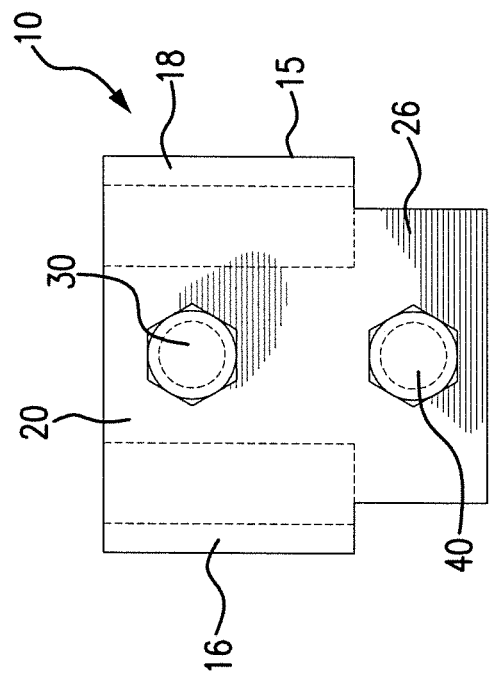
FIG. 3 shows a front view of the clip, as shown in FIG. 2.
Figure 2:
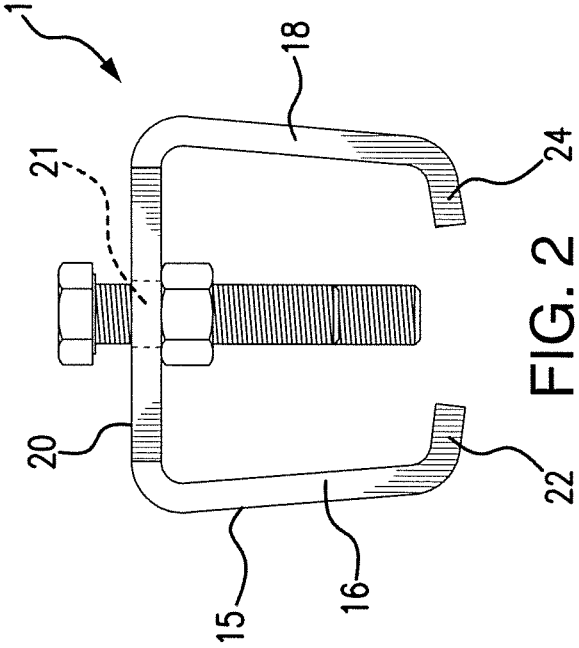
FIG. 2 shows a top view of a clip, according to one embodiment of this invention.

FIG. 1 shows a perspective view of clip 10 attached and/or secured directly to or with respect to hanger structure 50, according to one embodiment of this invention. FIGS. 1-6 show how clip 10 is secured and/or otherwise attached to or with respect to hanger structure 50 so that clip 10 can be adjustably positioned and/or locked to hold, secure and/or otherwise fix a position of clip 10 so that clip 10 can hold or bear the weight of hanger structure 50 and/or refractory structure 55.

As shown in FIGS. 1-6, according to some embodiments of this invention, fastener 30 is adjustably mounted or extends through body 15 of clip 10. Fastener 30 can be an externally threaded bolt, for example, as shown in FIGS. 1-4. In other embodiments of this invention, fastener 30 can be any other suitable mechanical and/or electromechanical device that allows fastener 30 to move, for example, with respect to body 15 of clip 10. In some embodiments of this invention, two clips 10 are positioned to contact or otherwise engage with hanger structure 50, for example, at opposite end portions of hanger structure 50. In some embodiments of this invention, each fastener 30 is moved to tighten clip 10 directly to or with respect to hanger structure 50. In some embodiments of this invention, fastener 30 can have a lock device to lock the position of fastener 30 with respect to body 15, for example, after clip 10 is tightened and/or otherwise secured with respect to hanger structure 50.

As shown in FIGS. 1-6, adjuster 40 is adjustably mounted or extends through body 15 of clip 10. In some embodiments of this invention, adjuster 40 is adjustably mounted and extends through tab 26 of body 15. In some embodiments of this invention, tab 26 is integrated with and/or forms one piece with top 20 of body 15. According to different embodiments of this invention, tab 26 can be sized, shaped and/or otherwise designed to allow adjuster 40 to move with respect to body 15 and thus adjust a position of tab 26 and/or body 15. In some embodiments of this invention, such as shown in FIG. 1, tab 26 extends beyond body 15. For example, tab 26 extends beyond leg 16 and/or leg 18 of body 15.

Adjuster 40 can be an externally threaded bolt, for example, as shown in FIGS. 1-4. In other embodiments of this invention, adjuster 40 can be any other suitable mechanical and/or electromechanical device that allows adjuster 40 to move with respect to tab 26 and/or body 15 of clip 10. In some embodiments of this invention, once clip 10 is positioned to contact or otherwise engage with or be secured to hanger structure 50, adjuster 40 is moved to adjust a distance, such as a vertical height, of clip 10, hanger structure 50, and/or refractory structure 55, for example, to compensate for a distance change due to a bending or distorting of structural members 57. In some embodiments of this invention, adjuster 40 can have and/or cooperate with a lock device, such as lock 42 and/or lock 44, to secure and/or lock the position of adjuster 40 with respect to tab 26 and/or body 15, for example, after clip 10 is tightened and/or otherwise secured with respect to hanger structure 50.

In some embodiments according to this invention, a travel distance of adjuster 40 can be varied to adjust a distance, such as a vertical height, of clip 10 with respect to structural members 57. As shown in FIG. 1, adjuster 40 can be rotated and/or otherwise positioned with respect to tab 26 and/or body 15 to move a relative position, such as a vertical position, of clip 10 with respect to structural members 57.

Figure 7:
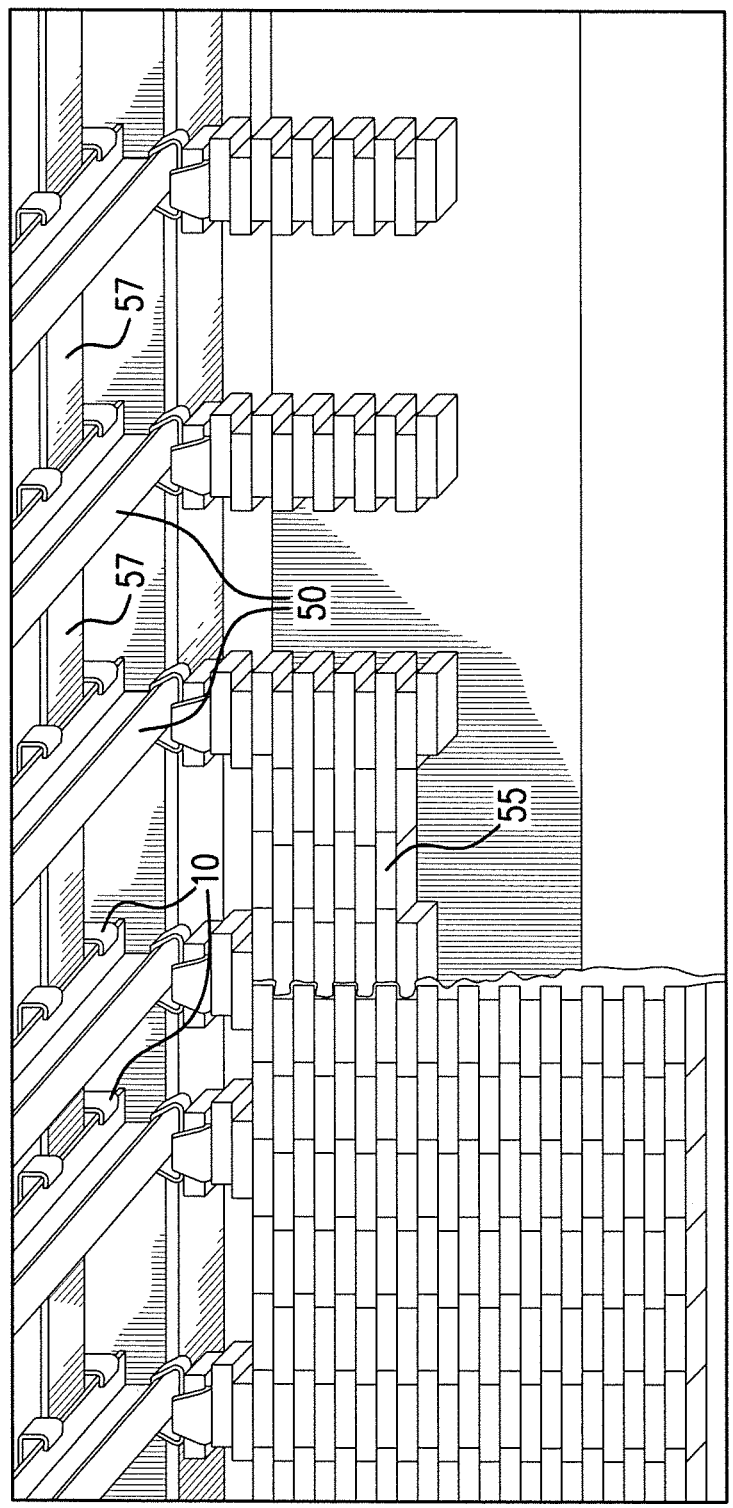
FIG. 7 shows a perspective view of a plurality of clips, hanger structures, and refractory structures, according to one embodiment of this invention.

In some embodiments according to this invention, clip 10 is used to support or forcibly retain hanger structure 50 and has body 15 with top 20 attached to, connected to and/or integrated with leg 16 and leg 18. In some embodiments of this invention, body 15 has flange 22 attached to, connected to and/or integrated with leg 16, and body 15 has flange 24 attached to, connected to and/or integrated with leg 18. In some embodiments of this invention, such as shown in FIG. 7, refractory structure 55 is attached to, connected to and/or integrated with separate or additional pieces, such as a metal clip or other suitable piece of material, to be held or otherwise suspended from hanger structure 50, for example, with respect to structural member 57, and these embodiments can be used to allow refractory structure 55 to move or expand in one and/or two horizontal directions.

According to some embodiments of this invention, body 15 has an overall U-shape or C-shape. In some embodiments of this invention, a U-shaped body 15 has flanges 22 and 24 engaging with and/or making contact with hanger structure 50 in order to secure and/or fix a position of clip 10 with respect to hanger structure 50. In some embodiments of this invention, flanges 22 and 24 may contact with and thus engage and forcibly hold clip 10 directly to or with respect to hanger structure 50. In other embodiments of this invention, body 15 can have any other suitable shape and/or design that allows body 15 to remain fixed directly to or with respect to hanger structure 50.

According to some embodiments of this invention, fastener 30 is adjustable and extends through void 21 within top 20. In some embodiments of this invention, adjuster 40 is adjustable and extends through void 27 of tab 26. Voids 21 and 27 can be an opening, a space, a hollow, a bore and/or any other suitable void that allows fastener 30 and/or adjuster 40 to pass through or move with respect to body 15.

In some embodiments of this invention, adjuster 40 is movably mounted with respect to body 15 and can be moved and/or locked into a position, for example, in which adjuster 40 is fixed with respect to tab 26 and/or another part of body 15. As shown in FIG. 1, lock 42 and/or lock 44 can be moved and locked into a position that fixes or secures a position of adjuster 40 with respect to body 15, and can be locked into place to prevent adjuster 40 from moving with respect to body 15. Adjuster 40 can have any other suitable mechanical and/or electromechanical configuration that allows adjuster 40 to move with respect to body 15 and then for adjuster 42 to be locked into place with respect to body 15.

As shown in FIGS. 1-7, fastener 30 and/or adjuster 40 moves with respect to body 15 of clip 10 so that a relative position of fastener 30 and/or adjuster 40 can be adjusted to correspondingly adjust a distance, such as a vertical height of hanger structure 50 and/or refractory structure 55, for example, to accommodate or compensate for bending, warping and/or otherwise distortion of one or more elements of structural members 57. In some embodiments of this invention, fastener 30 and/or adjuster 40 moves along a linear path which is generally perpendicular to top 20 and/or tab 26 of body 15. In other embodiments of this invention, fastener 30 and/or adjuster 40 can have any other suitable design and/or configuration that provides for movement and/or relative displacement of body 15 with respect to structural members 57.

In some embodiments according to this invention, moving adjuster 40 allows body 15 to move, such as along a vertical height or a vertical distance and any deformation of structural members 57 can be compensated for by adjusting the vertical height, the vertical distance and/or any other suitable distance of clip 10 directly to or with respect to structural members 57.

In some embodiments of this invention, a method for moving hanger structure 50 and/or refractory structure 55 includes securing clip 10 directly to or with respect to hanger structure 50 and/or refractory structure 55. Adjuster 40 can then be moved to adjust for or accommodate an undesired distance that clip 10 moves with respect to structural members 57.

While in the foregoing detailed description this invention has been described in relation to certain preferred embodiments thereof, and many details have been set forth for purposes of illustration, it will be apparent to those skilled in the art that this invention is susceptible to additional embodiments and that certain of the details described herein can be varied considerably without departing from the basic principles of this invention.

The invention claimed is:

1. A clip for supporting a refractory structure on a structural member, the clip comprising:
   a body including a first leg and a second leg, a top connected to the first leg and the second leg, a first flange connected to the first leg, a second flange connected to the second leg, wherein the first flange and the second flange are configured to extend under a first surface of a hanger structure of the refractory structure to support the refractory structure;

an adjustable fastener extending through a void in the top, wherein the adjustable fastener is configured to contact a second surface of the hanger structure to secure the hanger structure against the first flange and the second flange; and a tab extending from the top, and an adjuster movably mounted with respect to the tab, the adjuster configured to set on a mounting surface of the structural member.

2. A clip according to claim 1, wherein the adjuster is movable into a position in which the adjuster is fixed with respect to the tab.

3. A clip according to claim 1, wherein a lock adjustably secures the adjuster in a fixed position with respect to the body.

4. A clip according to claim 1, wherein the adjuster extends through a second void in the top, wherein the second void is in the tab.

5. A clip according to claim 1, wherein the adjuster moves along a linear path generally perpendicular to the tab.

6. A clip according to claim 1, wherein the adjuster moves along a linear path and a fastener fixes a position of the adjuster.

7. A clip according to claim 1, wherein the tab is integrated with the top.

8. A clip according to claim 1, wherein the tab extends beyond the first leg and the second leg.

9. A clip according to claim 1, wherein a movement of the adjuster moves the body with respect to a fixed structural member.

10. A clip according to claim 1, wherein the body has an overall U-shape and each of the first flange and the second flange is directed toward an interior of the body.

11. A clip for adjusting a distance of a hanger structure with respect to a fixed structural member, the clip comprising:

a body having an overall U-shape formed of two legs extending downward from opposing sides of a top, the top having a tab extending from the top, a fastener adjustably movable downward through the top to contact the hanger structure of a refractory structure to support the refractory structure on the structural member, a first flange and a second flange connected to the legs and directed toward an interior of the body, and an adjuster adjustably movable downward through the tab to contact the fixed structural member.

12. A clip according to claim 11, wherein the adjuster is movable into a position in which the adjuster is fixed with respect to the body.

13. A clip according to claim 11, wherein a lock adjustably secures the adjuster in a fixed position with respect to the body.

14. A clip according to claim 11, wherein the tab extends beyond the body.

15. A clip according to claim 11, wherein a movement of the adjuster moves the body with respect to a fixed structural member.

16. A clip according to claim 1, wherein the adjuster comprises a threaded bolt, and further comprising at least one threaded lock on the threaded bolt.

17. A clip according to claim 16, wherein the adjuster comprises a first threaded lock on a first side of the tab and a second threaded lock on a second side of the tab.

18. A clip for supporting a refractory structure, the clip comprising:

a body including a first leg and a second leg, a top connected to the first leg and the second leg, a first flange connected to the first leg, a second flange connected to the second leg, and a tab extending from the top, wherein the body has an overall U-shape and each of the first flange and the second flange is directed toward an interior of the body;

an adjustable fastener extending through a void in the top to contact a hanger structure of the refractory structure to support the refractory structure on a structural member;

an adjuster movably mounted with respect to the tab; and a lock configured to adjustably secure the adjuster in a fixed position with respect to the body.

19. A clip according to claim 18, wherein the adjuster extends through a second void in the tab.

20. A clip according to claim 18, wherein a movement of the adjuster moves the clip with respect to a fixed structural member.

* * * * *